No. 73,874.
C. F. CARPENTER.
REDUCING LEAD ORES.
PATENTED JAN. 28, 1868.
Fig.
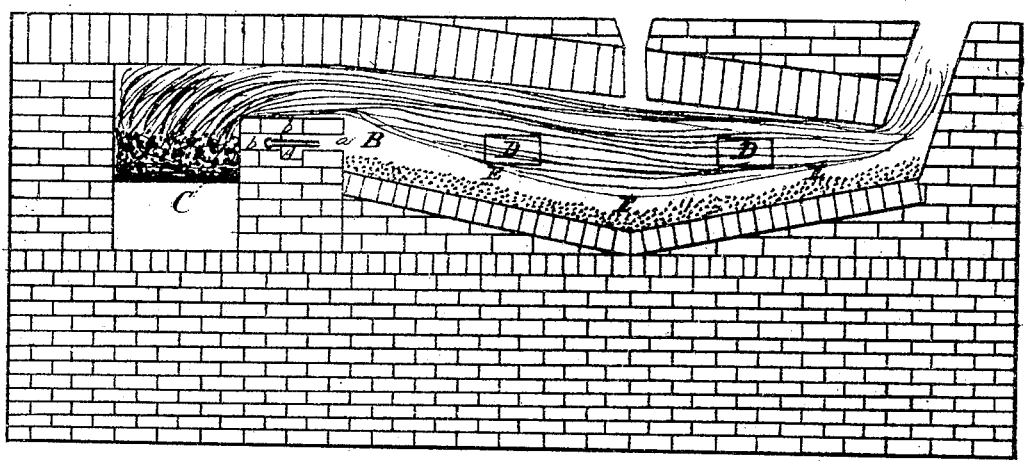
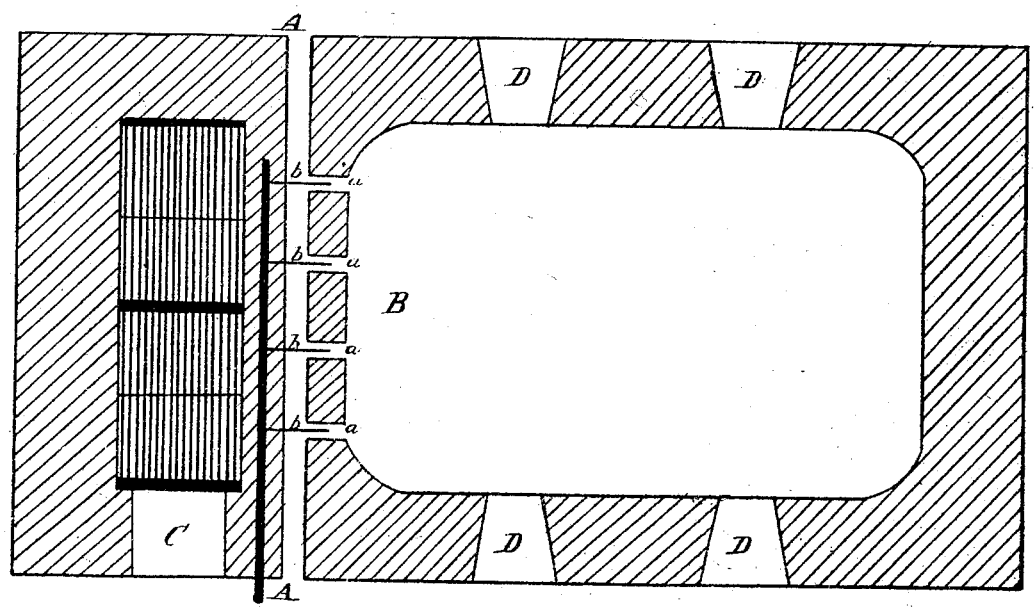
Witnesses
R. S. Stowe
F. Spiegelhalder
Inventor
Chas. F. Carpenter,

United States Patent Office.

CHARLES F. CARPENTER, OF LOUISVILLE, KENTUCKY.

Letters Patent No. 73,874, dated January 28, 1868.

IMPROVEMENT IN REDUCING LEAD ORES.

The Schedule referred to in these Letters Patent and making part of the same.

TO ALL WHOM IT MAY CONCERN:

Be it known that I, CHARLES F. CARPENTER, of the city of Louisville, in the county of Jefferson, in the State of Kentucky, have invented a new and improved Mode of Treating Lead Ores, for the purpose of oxidizing and desulphurizing them, and obtaining from them metallic lead; and I do hereby declare that the following is a full and exact description thereof, reference being had to the accompanying drawings, and to the letters of reference marked thereon.

The nature of my invention consists in introducing atmospheric air and steam, together or separately, into a reverberatory furnace, directly between the flame and the ores of lead which lie upon the hearth of the furnace. To accomplish this I conduct the air and steam through the fire-bridge, which, when red hot, gives the air and steam a high temperature, and causes them to act with great energy upon the heated ores of lead, and thus hastening the production of metallic lead.

To enable others to use my invention, I will proceed to describe its operation.

In the ordinary treatment of galena to produce metallic lead in a reverberatory furnace, the usual method is to open the side doors of the furnace, (which are marked D D in the drawing,) during the first stages of the process, thus allowing atmospheric air to enter the furnace, and convert the sulphides of lead into oxide and sulphate of lead. The doors are then closed, the heat raised, the oxides act upon the sulphates, sulphurous acid is formed, passes off, and leaves the lead in a metallic state. To hasten this process of converting the sulphides of lead into oxides and sulphates of lead, I introduce atmospheric air and steam directly between the flame and the ores, that is, into the space marked B in the accompanying drawing; consequently a powerfully-oxidizing stratum of air and steam constantly passes directly over the whole surface of the heated ores, from one end of the furnace to the other. The mode by which I introduce atmospheric air into this space marked B, is by a main channel, A, and smaller channels $a\ a\ a\ a\ a$, formed in the fire-bridge. This bridge, when red hot, intensely heats the air passing through it, and consequently it acts with great energy upon the said ores. I introduce steam through pipes in the fire-bridge, (marked $b\ b\ b\ b\ b$ in the drawing.) These pipes, when red hot, raise the steam to a high temperature, by which its action on the ores is increased. By this steam, the temperature of the furnace is readily controlled, and a greater or less amount of air made to pass by induction through the channels $a\ a\ a\ a\ a$.

What I claim as my invention, and desire to secure by Letters Patent, is—

The introduction of atmospheric air and steam, together or separately, directly into the space marked B, in a reverberatory furnace, so that they may pass directly between the flame and the ores of lead upon the hearth.

I also claim introducing air and steam through the fire-bridge, so that they may be intensely heated before acting on said ores, as herein described, or any other method substantially the same.

The above specification of my invention, signed by me, this 5th day of August, A. D. 1867.

CHAS. F. CARPENTER.

Witnesses:
R. T. STONE,
F. SPIEGELHALDER.